(12) United States Patent
Knöös

(10) Patent No.: US 11,851,819 B2
(45) Date of Patent: Dec. 26, 2023

(54) GAS BARRIER FILM FOR PACKAGING MATERIAL

(71) Applicant: Stora Enso OYJ, Helsinki (FI)

(72) Inventor: Isabel Knöös, Säffle (SE)

(73) Assignee: Stora Enso OYJ, Helsinki (FI)

( * ) Notice: Subject to any disclaimer, the term of this patent is extended or adjusted under 35 U.S.C. 154(b) by 388 days.

(21) Appl. No.: 17/295,962

(22) PCT Filed: Nov. 14, 2019

(86) PCT No.: PCT/IB2019/059775
§ 371 (c)(1),
(2) Date: May 21, 2021

(87) PCT Pub. No.: WO2020/104900
PCT Pub. Date: May 28, 2020

(65) Prior Publication Data
US 2022/0002946 A1 Jan. 6, 2022

(30) Foreign Application Priority Data
Nov. 22, 2018 (SE) .................... 1851444-8

(51) Int. Cl.
*D21H 11/20* (2006.01)
*C08J 7/043* (2020.01)
(Continued)

(52) U.S. Cl.
CPC ............. *D21H 11/20* (2013.01); *C08J 7/043* (2020.01); *C08J 7/048* (2020.01); *D21H 17/36* (2013.01);
(Continued)

(58) Field of Classification Search
CPC ........ D21H 11/20; D21H 19/56; D21H 21/14; D21H 27/16; D21H 17/36; D21H 27/18;
(Continued)

(56) References Cited

U.S. PATENT DOCUMENTS 4,107,426 A 8/1978 Gordon
11,248,343 B2 * 2/2022 Knöös ................... D21H 19/34
(Continued)

FOREIGN PATENT DOCUMENTS

CN 108778726 A 11/2018
CN 114127361 A * 3/2022 ............. B32B 27/10
(Continued)

OTHER PUBLICATIONS

International Search Report from corresponding PCT application No. PCT/IB2019/059775, dated Jan. 27, 2020.
(Continued)

*Primary Examiner* — Jose A Fortuna
(74) *Attorney, Agent, or Firm* — Greer, Burns & Crain, Ltd.

(57) ABSTRACT

The present invention relates to a gas barrier film for a paper or paperboard based packaging material, said gas barrier film comprising: a microfibrillated cellulose layer (MFC layer), at least one surface of which has been grafted with a fatty acid halide; and a polymer layer disposed on the at least one surface of the MFC layer which has been grafted with a fatty acid halide. The present invention further relates to a paper or paperboard based packaging material, containers and carton blanks comprising the gas barrier film, and to a method for manufacturing the gas barrier film.

21 Claims, 1 Drawing Sheet

(51) Int. Cl.
*C08J 7/048* (2020.01)
*D21H 17/36* (2006.01)
*D21H 19/56* (2006.01)
*D21H 21/14* (2006.01)
*D21H 27/36* (2006.01)
*D21H 27/16* (2006.01)
*D21H 27/18* (2006.01)

(52) U.S. Cl.
CPC ............. *D21H 19/56* (2013.01); *D21H 21/14* (2013.01); *D21H 27/16* (2013.01); *D21H 27/18* (2013.01); *D21H 27/36* (2013.01); *C08J 2301/10* (2013.01); *C08J 2423/06* (2013.01)

(58) Field of Classification Search
CPC ........ D21H 11/18; D21H 17/03; D21H 21/16; B32B 29/005; B32B 29/06; B32B 2255/02; B32B 2255/26; B32B 2262/062; B32B 2270/00; B32B 2307/718; B32B 2307/7244; B32B 2307/7265; B32B 2439/40; B32B 2439/70; B32B 2439/80; B32B 7/12; B32B 27/10; B32B 27/12; B32B 27/18; B32B 27/306; B32B 27/308; B32B 27/32; B32B 27/36; B32B 5/02; B32B 23/06; B32B 29/00; C08J 7/043; C08J 7/048; C08J 2301/10; C08J 2423/06; C08B 3/08
See application file for complete search history.

(56) References Cited

U.S. PATENT DOCUMENTS

| | | | | |
|---|---|---|---|---|
| 2005/0142373 | A1* | 6/2005 | Komatsu | C08K 5/098 525/98 |
| 2012/0094047 | A1 | 4/2012 | Albertson et al. | |
| 2013/0236647 | A1 | 9/2013 | Samain et al. | |
| 2014/0113080 | A1 | 4/2014 | Stinga et al. | |
| 2018/0179708 | A1 | 6/2018 | Karlsson et al. | |
| 2019/0091982 | A1* | 3/2019 | Heiskanen | B32B 29/00 |
| 2020/0023409 | A1* | 1/2020 | Axrup | B32B 29/00 |
| 2021/0207324 | A1* | 7/2021 | Knöös | D21H 11/18 |
| 2022/0002946 | A1* | 1/2022 | Knöös | B32B 7/12 |
| 2022/0242636 | A1* | 8/2022 | Hansson | D21H 17/28 |
| 2022/0340342 | A1* | 10/2022 | Knöös | D21H 19/52 |
| 2023/0002572 | A1* | 1/2023 | Nylén | D21H 23/28 |

FOREIGN PATENT DOCUMENTS

| | | | | |
|---|---|---|---|---|
| EP | 1553137 | A1 * | 7/2005 | ............ B32B 27/32 |
| EP | 2554589 | A1 | 2/2011 | |
| EP | 2371892 | A1 | 10/2011 | |
| EP | 2371893 | A1 | 10/2011 | |
| EP | 2551104 | A1 | 1/2013 | |
| EP | 2809712 | B1 * | 11/2018 | ............ C03C 17/30 |
| JP | 2000303386 | A | 10/2000 | |
| JP | 2014196400 | A | 10/2014 | |
| JP | 2022507930 | A * | 1/2023 | ............ D21H 11/20 |
| SE | 1351552 | A1 | 11/2014 | |
| SE | 543618 | C2 * | 4/2021 | ............ B32B 23/06 |
| WO | 2008076056 | A1 | 6/2008 | |
| WO | WO-2013113927 | A1 * | 8/2013 | ............ C03C 17/30 |
| WO | WO-2013171263 | A1 * | 11/2013 | ............ C08K 3/013 |
| WO | 2017115020 | A1 | 7/2017 | |
| WO | 2018083592 | A1 | 5/2018 | |
| WO | WO-2021005451 | A1 * | 1/2021 | ............ B32B 27/10 |
| WO | WO-2022157651 | A1 * | 7/2022 | |

OTHER PUBLICATIONS

D. Fengel, Ultrastructural behaviour of cell wall polysaccharides, Tappi J., Mar. 1970, vol. 53, No. 3, pp. 497-503.

Gary Chinga-Carrasco, Cellulose fibres, nanofibrils and microfibrils: The morphological sequence of MFC components from a plant physiology and fibre technology point of view, Chinga-Carrasco Nanoscale Research Letters, 2011, 6:417.

* cited by examiner

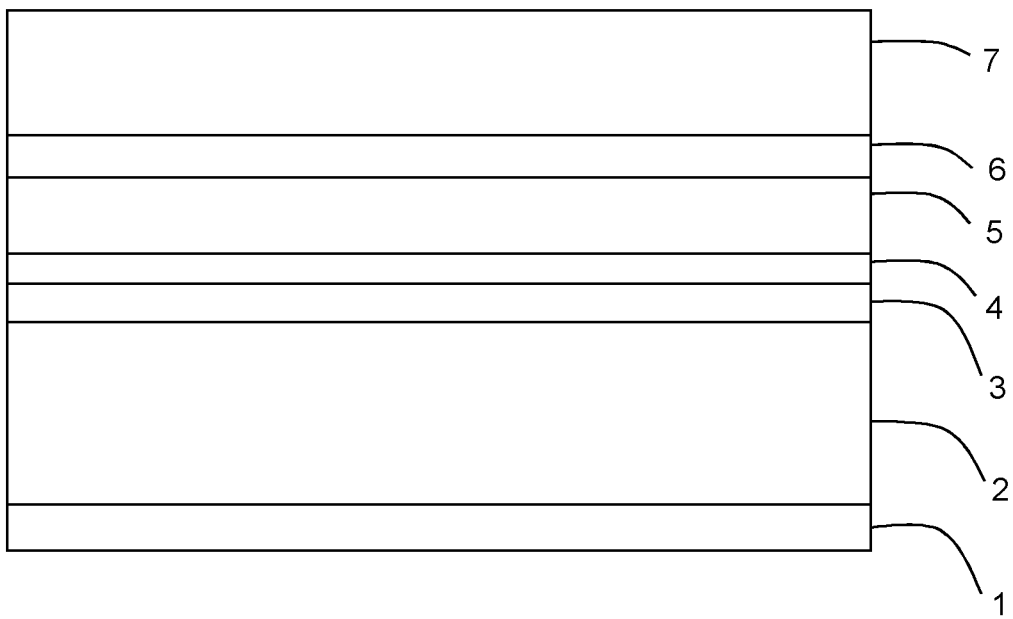

GAS BARRIER FILM FOR PACKAGING MATERIAL

This application is a U.S. National Phase under 35 U.S.C. § 371 of International Application No. PCT/IB2019/059775, filed Nov. 14, 2019, which claims priority under 35 U.S.C. §§ 119 and 365 to Swedish Application No. 1851444-8, filed Nov. 22, 2018.

TECHNICAL FIELD

The present disclosure relates to gas barrier films for paper and paperboard based packaging materials. More specifically, the present disclosure relates to gas barrier films based on microfibrillated cellulose having a good and stable oxygen transmission rate (OTR) at high relative humidities (RH). The present invention further relates to paper and paperboard based packaging materials comprising such barrier films and to methods for manufacturing such barrier films.

BACKGROUND

Coating of paper and paperboard with plastics is often employed to combine the mechanical properties of the paperboard with the barrier and sealing properties of a plastic film. Paperboard provided with even a relatively small amount of a suitable plastic material can provide the properties needed to make the paperboard suitable for many demanding applications, for example as liquid packaging board. In many cases however, the gas barrier properties of the polymer coated paperboard are still insufficient. Therefore, in order to ensure acceptable gas barrier properties the polymer coated paperboard is often provided with one or more layers of aluminum foil. However, due to its high carbon footprint there is a wish to replace aluminum foils in packaging materials in general, and in liquid packaging board in particular.

More recently, microfibrillated cellulose (MFC) films have been developed, in which defibrillated cellulosic fibrils have been suspended e.g. in water and thereafter re-organized and rebonded together to form a dense film with excellent gas barrier properties. Unfortunately, the gas barrier properties of such MFC films tend to deteriorate at high temperatures and high humidity.

Many approaches for improving the gas barrier properties towards oxygen, air, and aromas at high relative humidity have been investigated and described, but most of the suggested solutions are expensive and difficult to implement in industrial scale. One route is to modify the MFC or nanocellulose such as disclosed in EP2554589A1 where an MFC dispersion was modified with a silane coupling agent. Another patent application, EP2551104A1, teaches the use of MFC and polyvinyl alcohol (PVOH) and/or polyuronic acid with improved barrier properties at higher relative humidity. Another solution is to coat the film with a layer that has high water fastness and/or low water vapor transmission rate. JP2000303386A discloses, e.g., latex coated on MFC film, while US2012094047A suggests the use of wood hydrolysates mixed with polysaccharides such as MFC that can be coated with a polyolefin layer. In addition to these methods, the possibility of crosslinking fibrils or fibrils and copolymers has been investigated. This improves water fastness of the films but also water vapor transmission rates. EP2371892A1 and EP2371893A1 describe crosslinking of MFC with metal ions, glyoxal, glutaraldehyde and/or citric acid, respectively.

Another way to decrease the moisture sensitivity of cellulose is to chemically modify the cellulose with sodium periodate to obtain dialdehyde cellulose (DAC). By fibrillation of dialdehyde cellulose, a barrier film with improved moisture resistance can be produced. However, a dispersion comprising microfibrillated dialdehyde cellulose (DA-MFC) is very unstable since the DA-MFC sediments and spontaneously crosslinks to certain degree already in the dispersion, causing the microfibrils to be bound or entangled. The poor stability of the dispersion results in variations of the concentration of DA-MFC in the film leading to poor film formation and barrier properties.

Thus, there remains a need for improved solutions to replace aluminum layers in liquid packaging board, while maintaining acceptable liquid and oxygen barrier properties.

DESCRIPTION OF THE INVENTION

It is an object of the present disclosure to provide an alternative to the aluminum layer commonly used in liquid packaging board for providing liquid and oxygen barrier properties.

It is a further object of the present disclosure to provide an aluminum free paper or paperboard based packaging material having an oxygen transfer rate (OTR), measured according to the standard ASTM F-1927 at 80% relative humidity and 23° C., of less than 10 cc/m$^2$/24 h/atm, and preferably less than 5 cc/m$^2$/24 h/atm.

It is a further object of the present disclosure to provide an aluminum free paper or paperboard based packaging material having an oxygen transfer rate (OTR), measured according to the standard ASTM F-1927 at 90% relative humidity and 38° C., of less than 10 cc/m$^2$/24 h/atm, and preferably less than 5 cc/m$^2$/24 h/atm.

It is a further object of the present disclosure, to provide gas barrier film comprising microfibrillated cellulose, which has improved barrier properties even at higher relative humidity and temperature.

It is a further object of the present disclosure to provide a gas barrier film for a paper or paperboard based packaging material which is based at least partially on renewable raw materials.

The above mentioned objects, as well as other objects as will be realized by the skilled person in the light of the present disclosure, are achieved by the various aspects of the present disclosure.

According to a first aspect illustrated herein, there is provided a gas barrier film for a paper or paperboard based packaging material, said gas barrier film comprising:
 a microfibrillated cellulose layer (MFC layer), at least one surface of which has been grafted with a fatty acid halide; and
 a polymer layer disposed on the at least one surface of the MFC layer which has been grafted with a fatty acid halide.

Paper generally refers to a material manufactured in thin sheets from the pulp of wood or other fibrous substances comprising cellulose fibers, used for writing, drawing, or printing on, or as packaging material.

Paperboard generally refers to strong, thick paper or cardboard comprising cellulose fibers used for boxes and other types of packaging. Paperboard can either be bleached or unbleached, coated or uncoated, and produced in a variety of thicknesses, depending on the end use requirements.

MFC has been identified as an interesting component for use in barrier films for paper and paperboard packaging materials. MFC films have been found to provide low oxygen transfer rates at conditions of intermediate temperature and humidity, e.g. at 50% relative humidity and 23° C. Unfortunately, the gas barrier properties of such MFC films tend to deteriorate significantly at higher temperatures and humidities, e.g. at 90% relative humidity and 38° C., rendering the films unsuitable for many industrial liquid packaging applications.

The present inventor has now found that these deficiencies of prior art laminates comprising MFC can be remedied by a gas barrier film comprising an MFC layer, at least one surface of which has been grafted with a fatty acid halide, and a polymer layer disposed on the at least one surface of the MFC layer which has been grafted with a fatty acid halide.

A gas barrier film comprising an MFC layer grafted with fatty acid halide and a polymer layer provides both excellent liquid and oxygen barrier properties. Especially remarkable is the high oxygen barrier properties such laminate exhibits at high humidity and temperature. The term high humidity in the context of the present disclosure generally refers to a relative humidity (RH) of 80% and higher or of above 80%. The term high temperature in the context of the present disclosure generally refers to a temperature above 23° C.

The inventive gas barrier film can be used to manufacture a paper or paperboard based packaging material having an oxygen transfer rate (OTR), measured according to the standard ASTM F-1927 at 90% relative humidity and 38° C., of less than 10 cc/m$^2$/24 h/atm, and preferably less than 5 cc/m$^2$/24 h/atm. This makes the inventive gas barrier film an interesting and viable alternative to the aluminum layer commonly used in liquid packaging board for providing liquid and oxygen barrier properties.

Microfibrillated cellulose (MFC) shall in the context of the patent application be understood to mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view*, Nanoscale research letters 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as its large surface area or its ability to form a gel-like material at low solids (1-5 wt %) when dispersed in water.

The cellulose fiber is preferably fibrillated to such an extent that the final specific surface area of the formed MFC is from about 1 to about 200 m$^2$/g, or more preferably 50-200 m$^2$/g when determined for a freeze-dried material with the BET method.

Various methods exist to make MFC, such as single or multiple pass refining, pre-hydrolysis followed by refining or high shear disintegration or liberation of fibrils. One or several pre-treatment steps are usually required in order to make MFC manufacturing both energy efficient and sustainable. The cellulose fibers of the pulp to be utilized may thus be pre-treated, for example enzymatically or chemically, to hydrolyse or swell the fibers or to reduce the quantity of hemicellulose or lignin. The cellulose fibers may be chemically modified before fibrillation, such that the cellulose molecules contain other (or more) functional groups than found in the native cellulose. Such groups include, among others, carboxymethyl (CMC), aldehyde and/or carboxyl groups (cellulose obtained by N-oxyl mediated oxidation, for example "TEMPO"), quaternary ammonium (cationic cellulose) or phosphoryl groups. After being modified or oxidized in one of the above-described methods, it is easier to disintegrate the fibers into MFC or nanofibrils.

The nanofibrillar cellulose may contain some hemicelluloses, the amount of which is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose, or other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

The MFC of the MFC layer of the inventive gas barrier film may be unmodified MFC or chemically modified MFC, or a mixture thereof. In some embodiments, the MFC is an unmodified MFC. Unmodified MFC refers to MFC made of unmodified or native cellulose fibers. The unmodified MFC may be a single type of MFC, or it can comprise a mixture of two or more types of MFC, differing e.g. in the choice of cellulose raw material or manufacturing method. Chemically modified MFC refers to MFC made of cellulose fibers that have undergone chemical modification before, during or after fibrillation. In some embodiments, the MFC is a chemically modified MFC. The chemically modified MFC may be a single type of chemically modified MFC, or it can comprise a mixture of two or more types of chemically modified MFC, differing e.g. in the type of chemical modification, the choice of cellulose raw material or the manufacturing method. In some embodiments, the chemically modified MFC is microfibrillated dialdehyde cellulose (DA- MFC). DA-MFC is a dialdehyde cellulose treated in such way that it is microfibrillated. Dialdehyde cellulose can be obtained by oxidation of cellulose. Microfibrillated dialdehyde cellulose can be obtained by treating dialdehyde cellulose for example by a homogenizer or in any other way such that fibrillation occurs to produce microfibrillated dialdehyde cellulose. In some embodiments, the MFC of the MFC layer comprises 0-80 wt % DA-MFC, the remainder being unmodified MFC.

The MFC layer may be comprised solely of MFC, or it can comprise a mixture of MFC and other ingredients or additives. The MFC layer of the inventive gas barrier film preferably includes MFC as its main component based on the total dry weight of the MFC layer. In some embodiments, the MFC layer comprises at least 50 wt %, preferably at least 70 wt %, more preferably at least 80 wt % MFC, based on the total dry weight of the MFC layer.

The formulation of the MFC layer may vary depending on the intended use and on the other layers present in the finished multilayer packaging material. The formulation of the MFC layer may also vary depending on the intended mode of application or formation of the MFC layer, e.g. coating of an MFC dispersion onto a substrate or formation of a free standing MFC film for lamination to a substrate. The MFC layer may include a wide range of ingredients in varying quantities to improve the end performance of the product or processing of the coating. The MFC layer may further comprise additives such as starch, carboxymethyl cellulose, a filler, retention chemicals, flocculation additives, deflocculating additives, dry strength additives, softeners, or mixtures thereof. The MFC layer may further comprise additives that will improve different properties of the mixture and/or the produced film such as latex and/or polyvinyl alcohol (PVOH) for enhancing the ductility of the film.

In some embodiments, the MFC layer further comprises a polymeric binder. In some preferred embodiments, the MFC layer further comprises PVOH. The PVOH may be a single type of PVOH, or it can comprise a mixture of two or more types of PVOH, differing e.g. in degree of hydrolysis or viscosity. The PVOH may for example have a degree of hydrolysis in the range of 80-99 mol %, preferably in the range of 88-99 mol %. Furthermore, the PVOH may preferably have a viscosity above 5 mPa×s in a 4% aqueous solution at 20° C. DIN 53015/JIS K 6726.

In some embodiments, the MFC layer further comprises a pigment. The pigment may for example comprise inorganic particles of talcum, silicates, carbonates, alkaline earth metal carbonates and ammonium carbonate, or oxides, such as transition metal oxides and other metal oxides. The pigment may also comprise nano-size pigments such as nanoclays and nanoparticles of layered mineral silicates, for instance selected from the group comprising montmorillonite, bentonite, kaolinite, hectorite and hallyosite.

In some preferred embodiments, the pigment is selected from the group consisting of nanoclays and nanoparticles of layered mineral silicates, more preferably bentonite.

The basis weight (corresponding to the thickness) of the MFC layer of the inventive gas barrier film is preferably in the range of less than 55 gsm (grams per square meter). The basis weight of the MFC layer may for example depend on the mode of its manufacture. For example, coating of an MFC dispersion onto a substrate may result in a thinner layer, whereas the formation of a free standing MFC film for lamination to a substrate may require a thicker layer. In some embodiments, the basis weight of the MFC layer is in the range of 5-50 gsm. In some embodiments, the basis weight of the MFC layer is in the range of 5-20 gsm.

The MFC layer in itself, typically has an oxygen transfer rate (OTR), measured according to the standard ASTM F-1927 at 90% relative humidity and 38° C., of more than 200 cc/m$^2$/24 h/atm or even more than 1000 cc/m$^2$/24 h/atm.

At least one surface of the MFC layer has been grafted with a fatty acid halide. In some embodiments, the fatty acid halide grafted on the MFC layer is a C16 or C18 fatty acid halide, or a mixture thereof. In some preferred embodiments, the fatty acid halide grafted on the MFC layer is palmitoyl chloride or stearoyl chloride.

Grafting of the fatty acid halide to the hydroxylated MFC surface can be achieved by applying a fatty acid halide to the surface of the MFC layer and heating the surface to form covalent bonds between the fatty acid residue and hydroxyl groups of the MFC layer. The reaction between the fatty acid halide, e.g. fatty acid chloride, and the hydroxyl groups of the MFC layer results in ester bonds between the reagent and the MFC fibrils. Ungrafted and thereby unbound fatty acids may also be present to a certain extent. Upon the reaction with the hydroxyl groups on the substrate or with water in the substrate or in the air, hydrohalic acid, e.g. hydrochloric acid, is formed as a reaction byproduct. The grafting may preferably be followed by removal of the formed hydrohalic acid, and optionally by removal of the ungrafted residues. One example of a grafting process which could be used in production of the gas barrier film of the present disclosure is described in detail in US patent application 2013/0236647 A1. The grafting process may optionally be repeated, in order to increase the amount of grafted fatty acid residues.

The surprisingly exceptional barrier properties at high humidity of the inventive gas barrier film are a result of the combination of the fatty acid halide grafted MFC and the polymer layer disposed on the fatty acid halide grafted MFC.

The polymer layer may comprise any of the polymers commonly used in paper or paperboard based packaging materials in general or polymers used in liquid packaging board in particular. Examples include polyethylene (PE), polyethylene terephthalate (PET), polypropylene (PP) and polylactic acid (PLA). Polyethylenes, especially low density polyethylene (LDPE) and high density polyethylene (HDPE), are the most common and versatile polymers used in liquid packaging board.

The polymer layer of the gas barrier film preferably comprises a thermoplastic polymer. In some embodiments, the polymer layer comprises a polyolefin. Thermoplastic polymers, and particularly polyolefins are useful since they can be conveniently processed by extrusion coating techniques to form very thin and homogenous films with good liquid barrier properties. In some embodiments, the polymer layer comprises polypropylene or polyethylene. In preferred embodiments, the polymer layer comprises polyethylene, more preferably LDPE or HDPE.

The polymer layer may comprise one or more layers formed of the same polymeric resin or of different polymeric resins. In some embodiments the polymer layer comprises a mixture of two or more different polymeric resins. In some embodiments the polymer layer is a multilayer structure comprised of two or more layers, wherein a first layer is comprised of a first polymeric resin and a second layer is comprised of a second polymeric resin, which is different from the first polymeric resin.

To improve the adhesion between the polymer layer and the fatty acid halide grafted surface of the MFC layer, the polymer layer may further comprise an adhesion promotor. In some embodiments, the polymer layer further comprises a reactive or non-reactive tie resin for improving the adhesion between the polymer layer and the surface of the MFC layer which has been grafted with a fatty acid halide. Such reactive or non-reactive tie resins are well known to a person skilled in the art of extrusion coating. The type of tie resin used may be suitably selected depending on the type of polymer to be applied to the fatty acid halide grafted surface. Tie resins are typically polyethylene copolymers of polar and nonpolar repeat units, with or without functional reactive groups. Typical non-reactive tie resins include ethylene vinyl acetate (EVA) and ethylene methyl acrylate (EMA). Other important tie resins include acid modified olefin copolymers like ethylene acrylic acid (EAA) and ethylene methacrylic acid (EMAA). They are typically also considered non-reactive since no or only a small portion of the acid groups undergo chemical reactions such as esterification. Typical reactive tie layer resins include anhydride modified polyethylene (AMP), anhydride modified polypropylene, and anhydride modified ethylene acrylate. The tie resin for use in the polymer layer of the inventive gas barrier film is preferably a reactive or non-reactive copolymer based on ethylene and acrylic acid or methacrylate monomers, optionally modified with anhydride functional groups. Preferred tie resins for use in the polymer layer of the inventive gas barrier film include ethylene methyl acrylate (EMA) and anhydride modified ethylene acrylates.

In some embodiments, the polymer layer is formed by extrusion coating of the polymer onto the at least one surface of the MFC layer which has been grafted with a fatty acid halide. Extrusion coating is a process by which a molten plastic material is applied to a substrate, such as paper or paperboard to form a very thin, smooth and uniform layer. The coating can be formed by the extruded plastic itself, or the molten plastic can be used as an adhesive to laminate a solid plastic film onto the substrate. Common plastic resins used in extrusion coating include polyethylene (PE), polypropylene (PP), and polyethylene terephthalate (PET).

In a gas barrier film, wherein the polymer layer is a multilayer structure comprised of two or more layers, wherein a first layer is a tie layer comprised of a tie resin and a second layer is comprised of a second polymeric resin comprised of a thermoplastic polymer, e.g. a polyolefin, which is different from the first polymeric resin, the polymer layer may advantageously be formed by coextrusion coating of the first layer comprising the tie resin and the second layer comprising the thermoplastic polymer onto the at least one surface of the MFC layer which has been grafted with a fatty acid halide, such that the first layer forms a tie layer between the MFC layer and the second layer.

The basis weight (corresponding to the thickness) of the polymer layer of the inventive gas barrier film is preferably in less than 50 gsm (grams per square meter). In order to achieve a continuous and substantially defect free film, a basis weight of the polymer layer of at least 8 gsm, preferably at least 12 gsm is typically required. In some embodiments, the basis weight of the polymer layer is in the range of 8-50 gsm, preferably in the range of 12-50 gsm.

The inventive gas barrier layer may preferably be used as a gas barrier layer in a paper or paperboard based packaging material, particularly in liquid packaging board (LPB) for use in the packaging of liquids or liquid containing products. Therefore, according to a second aspect illustrated herein, there is provided a paper or paperboard based packaging material comprising:
 a paper or paperboard substrate; and
 a gas barrier film comprising:
  a microfibrillated cellulose layer (MFC layer), at least one surface of which has been grafted with a fatty acid halide; and
  a polymer layer disposed on the at least one surface of the MFC layer which has been grafted with a fatty acid halide.

The gas barrier film of the paper or paperboard based packaging material according to the second aspect may be further defined as set out above with reference to the first aspect.

In some embodiments, the MFC layer is attached to the paper or paperboard substrate directly, e.g. when MFC and a binder applied to the substrate as a coating or when MFC is wet laid onto the substrate. Thus, in some embodiments the MFC layer of the gas barrier film is in direct contact with the substrate.

In other embodiments, the MFC layer is attached to the paper or paperboard substrate indirectly, e.g. when the MFC layer or gas barrier film is laminated onto the substrate using an adhesive polymer layer disposed between the substrate and the MFC layer. Thus, in some embodiments the paper or paperboard based packaging material further comprises an adhesive polymer layer disposed between the substrate and the MFC layer of the gas barrier film. In a preferred embodiment, the adhesive polymer layer comprises a polyethylene. Polyethylene is useful since it can be conveniently processed by extrusion coating techniques to form very thin and homogenous films with good liquid barrier properties. The MFC layer or the entire gas barrier film may then be attached to the substrate by an extrusion coating lamination process. In an alternative embodiment, the adhesive polymer layer comprises a latex.

The paper or paperboard based packaging material preferably further comprises at least one protective polymer layer disposed on the substrate surface facing away from the gas barrier film. The protective polymer layer preferably comprises a thermoplastic polymer. In some embodiments, the polymer layer comprises a polyolefin. Thermoplastic polymers, and particularly polyolefins are useful since they can be conveniently processed by extrusion coating techniques to form very thin and homogenous films with good liquid barrier properties. In some embodiments, the polymer layer comprises a polypropylene or a polyethylene. In preferred embodiments, the polymer layer comprises a polyethylene, more preferably LDPE or HDPE.

In some embodiments, the paper or paperboard used in the paper or paperboard based packaging material has a basis weight in the range of 20-500 $g/m^2$, preferably in the range of 80-400 $g/m^2$.

In some non-limiting embodiments, the paper or paperboard based packaging material has the following general structures:
 Paperboard/MFC layer/Graft layer/PE
 Paperboard/MFC layer/Graft layer/Tie layer/PE
 Paperboard/PE (adhesive)/MFC layer/Graft layer/PE
 Paperboard/PE (adhesive)/MFC layer/Graft layer/Tie layer/PE
 PE (protective)/Paperboard/MFC layer/Graft layer/PE
 PE (protective)/Paperboard/MFC layer/Graft layer/Tie layer/PE
 PE (protective)/Paperboard/PE (adhesive)/MFC layer/Graft layer/PE
 PE (protective)/Paperboard/PE (adhesive)/MFC layer/Graft layer/Tie layer/PE
 PE (protective)/Paperboard/PE (adhesive)/Tie layer/MFC layer/Graft layer/Tie layer/PE
 PE (protective)/Paperboard/PE (adhesive)/Tie layer/Graft layer/MFC layer/Graft layer/Tie layer/PE The thickness (basis weight) of the outermost PE layers, is selected depending on if the layer is intended to form an outside or inside surface of a container manufactured from the packaging material. For example, an inside surface for a liquid packaging container may require a thicker PE layer to serve as a liquid barrier, whereas the outside surface a thinner PE layer may be sufficient.

A gas barrier film comprising an MFC layer grafted with fatty acid halide and a polymer layer provides both excellent liquid and oxygen barrier properties. Especially remarkable is the high oxygen barrier properties such laminate exhibits at high humidity and temperature. In some embodiments, the paper or paperboard based packaging material according to the second aspect disclosed herein has an oxygen transfer rate (OTR), measured according to the standard ASTM F-1927 at 80% relative humidity and 23° C., of less than 10 $cc/m^2/24$ h/atm, and preferably less than 5 $cc/m^2/24$ h/atm. In preferred embodiments, the paper or paperboard based packaging material according to the second aspect disclosed herein has an oxygen transfer rate (OTR), measured according to the standard ASTM F-1927 at 90% relative humidity and 38° C., of less than 10 $cc/m^2/24$ h/atm, and preferably less than 5 $cc/m^2/24$ h/atm. This makes the inventive gas barrier film an interesting and viable alternative to the aluminum layer commonly used in liquid packaging board for providing liquid and oxygen barrier properties.

According to a third aspect illustrated herein, there is provided a carton blank comprising a gas barrier film according to the first aspect or a paper or paperboard based packaging material according to the second aspect.

According to a fourth aspect illustrated herein, there is provided a container, particularly a liquid packaging container, comprising a gas barrier film according to the first aspect or a paper or paperboard based packaging material according to the second aspect.

According to a fourth aspect illustrated herein, there is provided a method for manufacturing a gas barrier film for a paper or paperboard based packaging material, comprising the steps of:
a) providing a layer of microfibrillated cellulose (MFC layer);
b) subjecting a surface of the MFC layer to grafting with a fatty acid halide;
c) applying a polymer layer to the surface of the MFC layer which has been grafted with the fatty acid halide.

In some embodiments, the MFC layer in step a) is provided on a paper or paperboard substrate.

In some embodiments, the MFC layer is attached to the paper or paperboard substrate directly, e.g. when MFC and a binder applied to the substrate as a coating or when MFC is wet laid onto the substrate. Thus, in some embodiments the MFC layer of the gas barrier film is in direct contact with the substrate. In a preferred embodiment, the MFC layer is provided on the paper or paperboard substrate by coating with an MFC coating composition (e.g. an MFC dispersion or suspension) followed by drying and/or curing to form the MFC layer.

In other embodiments, the MFC layer is attached to the paper or paperboard substrate indirectly. For example, in some embodiments the MFC layer is provided on the paper or paperboard substrate by lamination of an MFC layer to the substrate using an adhesive polymer layer disposed between the substrate and the MFC layer. Thus, in some embodiments the paper or paperboard based packaging material further comprises an adhesive polymer layer disposed between the substrate and the MFC layer of the gas barrier film. In a preferred embodiment, the adhesive polymer layer comprises polyethylene. Polyethylene is useful since it can be conveniently processed by extrusion coating techniques to form very thin and homogenous films with good liquid barrier properties. The MFC layer or the entire gas barrier film may then be attached to the substrate by a lamination process, e.g. extrusion coating lamination or gluing.

The MFC of the MFC layer of the inventive gas barrier film may be unmodified MFC or chemically modified MFC, or a mixture thereof. In some embodiments, the MFC is an unmodified MFC. Unmodified MFC refers to MFC made of unmodified or native cellulose fibers. The unmodified MFC may be a single type of MFC, or it can comprise a mixture of two or more types of MFC, differing e.g. in the choice of cellulose raw material or manufacturing method. Chemically modified MFC refers to MFC made of cellulose fibers that have undergone chemical modification before, during or after fibrillation. In some embodiments, the MFC is a chemically modified MFC. The chemically modified MFC may be a single type of chemically modified MFC, or it can comprise a mixture of two or more types of chemically modified MFC, differing e.g. in the type of chemical modification, the choice of cellulose raw material or the manufacturing method. In some embodiments, the chemically modified MFC is microfibrillated dialdehyde cellulose (DA-MFC). DA-MFC is a dialdehyde cellulose treated in such way that it is microfibrillated. Dialdehyde cellulose can be obtained by oxidation of cellulose. Microfibrillated dialdehyde cellulose can be obtained by treating dialdehyde cellulose for example by a homogenizer or in any other way such that fibrillation occurs to produce microfibrillated dialdehyde cellulose. In some embodiments, the MFC of the MFC layer comprises 0-80 wt % DA-MFC, the remainder being unmodified MFC.

The MFC layer may be comprised solely of MFC, or it can comprise a mixture of MFC and other ingredients or additives. The MFC layer of the inventive gas barrier film preferably includes MFC as its main component based on the total dry weight of the MFC layer. In some embodiments, the MFC layer comprises at least 50 wt %, preferably at least 70 wt %, more preferably at least 80 wt % MFC, based on the total dry weight of the MFC layer.

The formulation of the MFC layer may vary depending on the intended use and other layers present in the finished multilayer packaging material. The formulation of the MFC layer may also vary depending on the intended mode of application or formation of the MFC layer, e.g. coating of an MFC dispersion onto a substrate or formation of a free standing MFC film for lamination to a substrate. The MFC layer may include a wide range of ingredients in varying quantities to improve the end performance of the product or processing of the coating.

In some embodiments, the MFC layer further comprises a polymeric binder. In some preferred embodiments, the MFC layer further comprises polyvinyl alcohol (PVOH). The PVOH may be a single type of PVOH, or it can comprise a mixture of two or more types of PVOH, differing e.g. in degree of hydrolysis or viscosity. The PVOH may for example have a degree of hydrolysis in the range of 80-99 mol %, preferably in the range of 88-99 mol %. Furthermore, the PVOH may preferably have a viscosity above 5 mPa×s in a 4% aqueous solution at 20° C. DIN 53015/JIS K 6726.

In some embodiments, the MFC layer further comprises a pigment. The pigment may for example comprise inorganic particles of talcum, silicates, carbonates, alkaline earth metal carbonates and ammonium carbonate, or oxides, such as transition metal oxides and other metal oxides. The pigment may also comprise nano-size pigments such as nanoclays and nanoparticles of layered mineral silicates, for instance selected from the group comprising montmorillonite, bentonite, kaolinite, hectorite and hallyosite.

In some preferred embodiments, the pigment is selected from the group consisting of nanoclays and nanoparticles of layered mineral silicates, more preferably bentonite.

The basis weight (corresponding to the thickness) of the MFC layer of the inventive gas barrier film is preferably in the range of less than 55 gsm (grams per square meter). The basis weight of the MFC layer may for example depend on the mode of its manufacture. For example, coating of an MFC dispersion onto a substrate may result in a thinner layer, whereas the formation of a free standing MFC film for lamination to a substrate may require a thicker layer. In some embodiments, the basis weight of the MFC layer is in the range of 5-50 gsm. In some embodiments, the basis weight of the MFC layer is in the range of 5-20 gsm.

In step b) of the method a surface of the MFC layer is subjected to grafting with a fatty acid halide.

At least one surface of the MFC layer is grafted with the fatty acid halide. In some embodiments, the fatty acid halide grafted on the MFC layer is a C16 or C18 fatty acid halide, or a mixture thereof. In some preferred embodiments, the fatty acid halide grafted on the MFC layer is palmitoyl chloride or stearoyl chloride.

Grafting of the fatty acid halide to the hydroxylated MFC surface can be achieved by applying a fatty acid halide to the surface of the MFC layer and heating the surface to form covalent bonds between the fatty acid residue and hydroxyl groups of the MFC layer. The reaction between the fatty acid halide, e.g. fatty acid chloride, and the hydroxyl groups of the MFC layer results in ester bonds between the reagent and the MFC fibrils. Ungrafted and thereby unbound fatty acids may also be present to a certain extent. Upon the reaction with the hydroxyl groups on the substrate or with water in the substrate or in the air, hydrohalic acid, e.g. hydrochloric acid, is formed as a reaction byproduct. The grafting may preferably be followed removal of the formed hydrohalic acid, and optionally by removal of the ungrafted residues. One example of a grafting process which could be used in production of the gas barrier film of the present disclosure is described in detail in US patent application 2013/0236647 A1. The grafting process may optionally be repeated, in order to increase the amount of grafted fatty acid residues.

The surprisingly exceptional barrier properties at high humidity of the inventive gas barrier film are a result of the combination of the fatty acid halide grafted MFC and the polymer layer disposed on the fatty acid halide grafted MFC.

The polymer layer of the gas barrier film applied to the surface of the MFC layer which has been grafted with the fatty acid halide in step c) of the inventive method preferably comprises a thermoplastic polymer. In some embodiments, the polymer layer comprises a polyolefin. Thermoplastic polymers, and particularly polyolefins are useful since they can be conveniently processed by extrusion coating techniques to form very thin and homogenous films with good liquid barrier properties. In some embodiments, the polymer layer comprises polypropylene or polyethylene. In preferred embodiments, the polymer layer comprises polyethylene, more preferably LDPE or HDPE.

The polymer layer may comprise one or more layers formed of the same polymeric resin or of different polymeric resins. In some embodiments, the polymer layer comprises a mixture of two or more different polymeric resins. In some embodiments, the polymer layer is a multilayer structure comprised of two or more layers, wherein a first layer is comprised of a first polymeric resin and a second layer is comprised of a second polymeric resin, which is different from the first polymeric resin.

To improve the adhesion between the polymer layer and the fatty acid halide grafted surface of the MFC layer, the polymer layer may further comprise an adhesion promotor. In some embodiments, the polymer layer further comprises a reactive or non-reactive tie resin for improving the adhesion between the polymer layer and the surface of the MFC layer which has been grafted with a fatty acid halide. Such reactive or non-reactive tie resins are well known to a person skilled in the art of extrusion coating. The type of tie resin used may be suitably selected depending on the type of polymer to be applied to the fatty acid halide grafted surface. Tie resins are typically polyethylene copolymers of polar and nonpolar repeat units, with or without functional reactive groups. Typical non-reactive tie resins include ethylene vinyl acetate (EVA) and ethylene methyl acrylate (EMA). Other important tie resins include acid modified olefin copolymers like ethylene acrylic acid (EAA) and ethylene methacrylic acid (EMAA). They are typically also considered non-reactive since no or only a small portion of the acid groups undergo chemical reactions such as esterification. Typical reactive tie layer resins include anhydride modified polyethylene (AMP), anhydride modified polypropylene, and anhydride modified ethylene acrylate. The tie resin for use in the polymer layer of the inventive gas barrier film is preferably a reactive or non-reactive copolymer based on ethylene and acrylic acid or methacrylate monomers, optionally modified with anhydride functional groups. Preferred tie resins for use in the polymer layer of the inventive gas barrier film include ethylene methyl acrylate (EMA) and anhydride modified ethylene acrylates.

In some embodiments, the polymer layer in step c) is applied by extrusion coating of the polymer onto the at least one surface of the MFC layer which has been grafted with a fatty acid halide.

In a gas barrier film, wherein the polymer layer is a multilayer structure comprised of two or more layers, wherein a first layer is a tie layer comprised of a tie resin and a second layer is comprised of a second polymeric resin comprised of a thermoplastic polymer, e.g. a polyolefin, which is different from the first polymeric resin, the polymer layer in step c) may advantageously be applied by coextrusion coating of the first layer comprising the tie resin and the second layer comprising the thermoplastic polymer onto the at least one surface of the MFC layer which has been grafted with a fatty acid halide, such that the first layer forms a tie layer between the MFC layer and the second layer.

The basis weight (corresponding to the thickness) of the polymer layer of the inventive gas barrier film is preferably in less than 50 gsm (grams per square meter). In order to achieve a continuous and substantially defect free film, a basis weight of the polymer layer of at least 8 gsm, preferably at least 12 gsm is typically required. In some embodiments, the basis weight of the polymer layer is in the range of 8-50 gsm, preferably in the range of 12-50 gsm.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

BRIEF DESCRIPTION OF THE DRAWINGS

FIG. 1 is a schematic view of the layers of an LPB structure comprising a gas barrier film according to the present disclosure.

EXAMPLE—GRAFTING AN MFC-FILM WITH FATTY ACID IN A PE-LAMINATED LPB STRUCTURE TO IMPROVE OXYGEN TRANSMISSION RATE

Two grafted samples (Sample 1 and Sample 2) and two corresponding ungrafted reference samples (Reference 1 and Reference 2) were prepared.

Sample 1 and Reference 1 used a film containing 70 wt % DA-MFC with a degree of oxidation of 30%, 17 wt % unmodified MFC, 9 wt % PVOH and 4 wt % bentonite.

Sample 2 and Reference 2 used a film containing 84 wt % unmodified MFC, 4 wt % DA-MFC with a degree of oxidation of 40%, 8 wt % PVOH and 4 wt % bentonite.

The PVOH grade had a viscosity of 12.5-17.5 mPa*s of a 4% aqueous solution at 20° C., DIN 53015/JIS K 6726 and a hydrolysis degree of 99%. The bentonite was Na-Cloisite.

The mixture for manufacturing the film according to Sample 1 and Reference 1 was prepared as follows. Polyvinyl alcohol was jet cooked for 2 h at a solid content of 14 wt %. The bentonite clay was mixed with high shear rate for 2 h at a solids content of 8 wt % and was then left for at least 48 h for swelling without mixing.

A mixture of MFC and DA-MFC was prepared by mixing 80% of a dialdehyde cellulose (DAC) mixture comprised of equal amounts of DAC having a degree of oxidation of 40% and 20%, respectively, with 20 wt % of unmodified MFC. The mixing time was 1 h. Afterwards, the mixture was run 3 passages in a Microfluidizer M-110EH, resulting in a DA-MFC-MFC suspension. The solids content was 3 wt %. Said suspension, seen as 100 wt % solid content, was mixed with 10 wt % PVOH and 5 wt % of Bentonite clay. The suspension was mixed with high shear mixing for 1 hour prior to film making. The suspension was thereafter deaerated in a vacuum assisted mixing using a speed mixer. The film was produced by rod coating the dispersion on a plastic surface, which was then left for air drying for at least 12 h. The estimated temperature during drying was 23° C.

The mixture for manufacturing the film according to Sample 2 and Reference 2 was prepared as follows. Polyvinyl alcohol was jet cooked for 2 h at a solids content of 14 wt %. The bentonite clay was mixed with high shear rate for 2 h at a solids content of 8 wt % and was then left for at least 48 h for swelling without mixing. An unmodified MFC at 3 wt % dry content, seen as 100 wt % solid content, was mixed with 10 wt % PVOH and 5 wt % of Bentonite clay. The suspension was mixed with high shear mixing for 1 hour. After the first mixing 7 wt % of a mixture consisting of 60 wt % DA-MFC with a degree of oxidation of 40% and 40 wt % of an unmodified MFC was added at a dry content of 3 wt %. The new suspension was mixed with high shear mixing for 1 hour. The suspension was thereafter deaerated in a vacuum assisted mixing using speed mixing. The film was produced by rod coating the dispersion on a plastic surface, which was then left for air drying for at least 12 h. The estimated temperature during drying was 23° C.

The films referred to as Reference 1 and 2 and Sample 1 and 2 were after drying separated from the plastic substrate. The obtained films had a thickness of 35-50 μm and a grammage of about 50 g/m².

Sample 1 and 2 were grafted with 1 g/m² palmitoyl acid chloride at a temperature of 180° C. and a speed of 50 m/min. The grafting was performed in a pilot machine essentially in accordance with the method described in US patent application 2013/0236647 A1. The corresponding References were not grafted. The MFC films were tested with respect to the OTR at a relative humidity of 90% at 38° C. (38/90) according to ASTM F-1927. The results are shown in Table 2.

The films were then laminated with extruded LDPE (CA7230 from Borealis) into a LPB structure as schematically depicted in FIG. 1. With reference to FIG. 1, Layer 1 is an LDPE protective layer (15 g/m²). Layer 2 corresponds to a packaging board (double mineral coated Natura 200 mN from Stora Enso with a board weight of 240 g/m²). Layer 3 is an LDPE adhesive layer (15 g/m²). Layer 5 is the MFC film of References 1 and 2 and Samples 1 and 2. Layer 7 is an LDPE layer (50 g/m²). Layer 1 is intended to form the layer towards the outside of the package and Layer 7 is intended to form the inside layer of the package, facing the contained liquid. Layers 4 and 6 were tie resins (Bynel 21E830 from DuPont) for the grafted Samples and LDPE for the References. When tie resin was used, the grammage of Layer 6 was about 25% of Layer 7 and Layer 4 had the same grammage as layer 5.

The laminates of the films referred to as Reference 1 and 2 and Sample 1 and 2 were tested with respect to the OTR at a relative humidity of 90% at 38° C. (38/90) according to ASTM F-1927. The results are shown in Table 1 below.

TABLE 1

OTR of whole LPB structure with different barrier films

| Sample | Nanocellulose | Additive | Grafting | OTR 38/90 |
|---|---|---|---|---|
| Reference 1 | 84% MFC<br>4% DA-MFC | 8% PVOH<br>4% bentonite | No | 62 |
| Sample 1 | 84% MFC<br>4% DA-MFC | 8% PVOH<br>4% bentonite | Yes | 2.9 |
| Reference 2 | 70% DA-MFC<br>17% MFC | 9% PVOH<br>4% bentonite | No | 38 |
| Sample 2 | 70% DA-MFC<br>17% MFC | 9% PVOH<br>4% bentonite | Yes | 1.8 |

The OTR values measured for the LPB structures in Table 1 were all stable at the end of the measuring time. The pre conditioning of the LPB in the climate to be measured was 2 weeks.

The results show that the films which have been grafted provide better oxygen barrier properties at high relative humidity and high temperature compared to the films which have not been grafted. In this context "high relative humidity" corresponds to at least 80%, or preferably above 80%.

It was further noted that no improvement of the oxygen barrier properties was obtained in the grafted MFC films prior to lamination into the LPB structure. In fact, the grafted MFC films exhibited reduced oxygen barrier properties as compared to the ungrafted MFC films at 90% relative humidity and 38° C. It is thus clear that the improvement of the oxygen barrier properties in the LPB structure with the grafted films is an effect of the combination of the grafting and the polyethylene layer.

TABLE 2

OTR of corresponding MFC films without any PE or board

| Sample | Nanocellulose | Additive | Grafting | OTR 38/90 |
|---|---|---|---|---|
| Reference 1 | 84% MFC 4% DA-MFC | 8% PVOH 4% bentonite | No | 19 (+0.1) |
| Sample 1 | 84% MFC 4% DA-MFC | 8% PVOH 4% bentonite | Yes | 112 |
| Reference 2 | 70% DA-MFC 17% MFC | 9% PVOH 4% bentonite | No | 51 (+2) |
| Sample 2 | 70% DA-MFC 17% MFC | 9% PVOH 4% bentonite | Yes | 166 (+1) |

The values in table 2 were taken after 24 h measurement where some of the values were not yet stable. The values in parentheses reflect the observed value change at the end of the measuring cycle. Where no parenthesis is added, the values were stable.

The degree of oxidation of the DA-MFC corresponds to the amount of C2-C3 bonds that are converted to aldehyde compared to all C2-C3 bonds. This was measured using the method of H. Zhao and N. D. Heindel, "Determination of Degree of Substitution of Formyl Groups in Polyaldehyde Dextran by the Hydroxylamine Hydrochloride Method", Pharmaceutical Research, vol. 8, pp. 400-402, 1991, where the available aldehyde groups react with hydroxylamine hydrochloride. This forms oxime groups and releases hydrochloric acid. The hydrochloric acid is titrated with sodium hydroxide until pH 4 is reached, and the degree of oxidation is thereafter calculated according to the formula below. The obtained aldehyde content is divided by two to get the value of the degree of oxidation, since an oxidized anhydroglucose unit has two aldehyde groups.

$$D.O[\%] = \frac{V_{NaOH} \times c_{NaOH}}{m_{sample} \times M_w} \times \frac{1}{2} \times 100$$

$V_{NaOH}$=the amount of sodium hydroxide needed to reach pH 4 (l)
$C_{NaOH}$=0.1 mol/l
$m_{sample}$=dry weight of the analysed DAC sample (g)
$M_w$=160 g/mol, which is the molecular weight of the dialdehyde cellulose unit

The invention claimed is:

1. A gas barrier film for a paper or paperboard based packaging material, said gas barrier film comprising:
   a microfibrillated cellulose layer (MFC layer), at least one surface of which has been grafted with a fatty acid halide; and
   a polymer layer disposed on the at least one surface of the MFC layer which has been grafted with a fatty acid halide.

2. The gas barrier film according to claim 1, wherein the MFC layer comprises at least 50 wt % MFC, based on a total dry weight of the MFC layer.

3. The gas barrier film according to claim 1, wherein the MFC layer further comprises polyvinyl alcohol (PVOH).

4. The gas barrier film according to claim 1, wherein the MFC layer further comprises a pigment.

5. The gas barrier film according to claim 1, wherein a basis weight of the MFC layer is in a range of less than 55 gsm.

6. The gas barrier film according to claim 1, wherein the fatty acid halide grafted on the MFC layer is a C16 fatty acid halide, or a C18 fatty acid halide, or a mixture thereof.

7. The gas barrier film according to claim 1, wherein the fatty acid halide grafted on the MFC layer is palmitoyl chloride or stearoyl chloride.

8. The gas barrier film according to claim 1, wherein the polymer layer comprises a thermoplastic polymer.

9. The gas barrier film according to claim 8, wherein the polymer layer further comprises a reactive or non-reactive tie resin for improving the adhesion between the polymer layer and the at least one surface of the MFC layer which has been grafted with a fatty acid halide.

10. A paper or paperboard based packaging material comprising:
    a paper or paperboard substrate; and
    a gas barrier film according to claim 1.

11. The paper or paperboard based packaging material according to claim 10, wherein the MFC layer of the gas barrier film is in direct contact with the substrate.

12. The paper or paperboard based packaging material according to claim 10, further comprising an adhesive polymer layer disposed between the substrate and the MFC layer.

13. The paper or paperboard based packaging material according to claim 10, further comprising at least one protective polymer layer disposed on a substrate surface facing away from the gas barrier film.

14. The paper or paperboard based packaging material according to claim 10, having an oxygen transfer rate (OTR), measured according to the standard ASTM F-1927 at 80% relative humidity and 23° C., of less than 10 cc/m²/24 h/atm.

15. A carton blank comprising a gas barrier film according to claim 1.

16. A container comprising a gas barrier film according to claim 1.

17. A method for manufacturing a gas barrier film for a paper or paperboard based packaging material, comprising the steps of:
    a) providing a layer of microfibrillated cellulose (MFC layer);
    b) subjecting a surface of the MFC layer to grafting with a fatty acid halide; and,
    c) applying a polymer layer to the surface of the MFC layer which has been grafted with the fatty acid halide.

18. The method according to claim 17, wherein the MFC layer is provided on a paper or paperboard substrate.

19. The method according to claim 17, wherein the grafting comprises applying a fatty acid halide to a surface of the MFC layer and heating the surface to form covalent bonds between the fatty acid halide and hydroxyl groups of the MFC layer.

20. The method according to claim 17, wherein the polymer layer is applied by extrusion coating of a thermoplastic polymer to the surface of the MFC layer which has been grafted with the fatty acid halide.

21. The method according to claim 20, wherein the polymer layer is formed by coextrusion coating of a first layer comprising a tie resin and a second layer comprising the thermoplastic polymer onto the surface of the MFC layer which has been grafted with a fatty acid halide, such that the first layer forms a tie layer between the MFC layer and the second layer.

\* \* \* \* \*